Patented Dec. 11, 1934

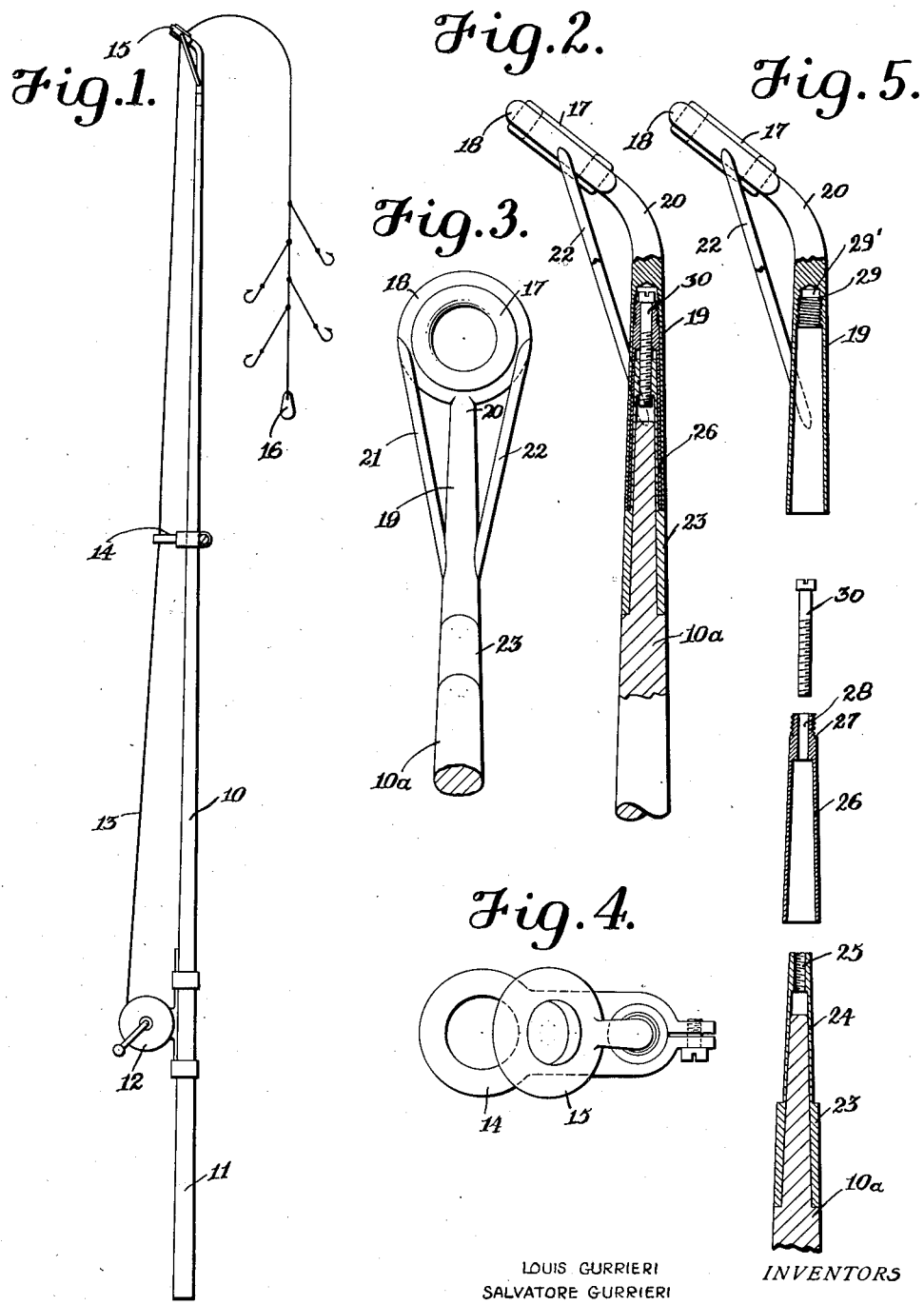

1,984,349

UNITED STATES PATENT OFFICE 1,984,349

FISHING ROD TIP END

Louis Gurrieri and Salvatore Gurrieri, Canarsie, N. Y.

Application July 7, 1933, Serial No. 679,300

1 Claim. (Cl. 43—24)

This invention relates generally to fishing rod tips or tops and more specifically to a fishing rod used for casting.

The main object of the invention is the provision of a fishing rod tip so constructed as to shed the fishing line easily and quickly thereby eliminating knotting, cutting or tangling about the tip.

Another object of the invention is the provision of a structure such that the line will at all times be maintained out of contact with the ferrule thereby eliminating wearing of the tip by the passage of the fishing line.

A further object of the invention is the provision of a fishing rod tip which is adjustable or rotatable about the end of the fishing rod, which adjustability affords means for straightening out the rod after the same becomes bent by reason of constant strain in one direction.

Another object of the invention is the provision of a fishing rod tip which is easy of application, economical to manufacture and durable in use.

These objects and other incidental ends and advantages of the invention will incidentally appear hereinafter in the progress of the disclosure.

Accompanying this specification and forming part thereof is a drawing showing a preferred form of the invention in the several views and wherein corresponding reference characters designate corresponding parts throughout the several views.

Figure 1 is a side elevation of the fishing rod tip as attached to a fishing rod.

Figure 2 is a side elevational view partly in section of the fishing rod tip showing all the parts thereof in assembled form.

Figure 3 is a front elevational view of the fishing rod tip.

Figure 4 is a top plan view of Figure 1 showing the acute angle of the fishing rod tip with respect to any middle guide.

Figure 5 is an unassembled view of Figure 2.

In accordance with the invention and in accordance with the accompanying drawing, reference character 10 designates the ordinary fishing rod. 11 designates a handle therefor. 12 is a reel attached to the said handle 11 from which fishing line 13 emanates. 14 and 15 designate generally a middle guide and a fishing rod tip through which the fishing line 13 passes, the said fishing line 13 terminating in a weight or sinker 16. The ordinary fishing hooks are attached to the fishing line adjacent to the sinker 16.

17 represents the ordinary eye made of a smooth, hard and brittle material such as porcelain or agate and is provided with a securing ring 18 affixed therearound intermediate the width of the said eye 17. 19 represents a ferrule portion which is affixed to the securing ring 18 at the end of the lower vertical diameter by means of a curved continuous neck portion 20 of the said ferrule 19.

Eye 17 and securing ring 18 therearound make an obtuse angle with respect to the length of ferrule 19 so that the fishing line touches only the inner surface of eye 17 when the fishing rod is in operative condition. Moreover the curved neck portion 20 of ferrule 19 eliminates discontinuous projections, indentations or recesses in conjunction with braces hereinafter to be described, such a structure eliminating possibility of tangling, cutting or wearing of the line during the act of casting.

21 and 22 represent braces tapering upwardly from the sides of ferrule 19 to which the said braces are brazed or soldered and terminate along the opposite ends of the horizontal diameter preferably of securing ring 18 to which the said braces are brazed or soldered.

Ferrule 19 is provided with a conically tapered chamber, the upper part of said chamber having internal threads 29 and a small socket 29' thereabove constituting the end of the tapered chamber of ferrule 19. 23 as seen from the lowermost figure of Figure 5 is a tapered element provided with an internal chamber and is adapted to be permanently affixed to the fishing rod end 10A. Such tapered element 23 is reduced in diameter to form a thinner tapering portion 24, the said portion 24 being provided at its top with a screw thread 25.

26 is an intermediate tapering element provided with a tapering internal chamber surmounted by a vertical bore of reduced diameter 28, the said bore 28 being adapted to serve as a bearing for a longitudinal screw 30 which said screw 30 coordinates with the female thread 25 in tapering element 23.

Intermediate tapering element 26 telescopes with portion 24 of the tapering element 23 down to the shoulder formed by the reduction in diameter of the said tapering element 23, and remains in place by frictional engagement. In such position screw 30 may be manipulated so as to penetrate the head of the reduced tapering element 24 of 23 any determined distance.

Ferrule 19 is now in a position to be engaged with the intermediate tapering element 26 by virtue of the male and female threads 28 and 29 respectively. The extent to which the ferrule 19 penetrates the bearing surface of intermediate tapering element 26 is determined by the depth to which screw 30 engages the female thread 25 of tapering element 23.

By raising or lowering screw 30 ferrule 19 is prevented from rotation around the intermediate tapering element 26 to the extent to which the said screw 30 has been raised, and increases its rotation in accordance with the lowering of the said screw 30. In this fashion ferrule 19 is made adjustable merely by removing the same from the intermediate tapering element 26 and adjusting screw 30 which engages with the female thread 25.

Figure 2 of the accompanying drawing shows the complete assembly of the structure of the fishing rod tip in accordance with the invention herein while Figure 5 shows the separate parts unassembled and in telescopic order.

We wish it understood that minor changes and variations in the integration and connection of the several parts, together with the nature of materials may all be resorted to without departing from the spirit of the invention and without departing from the scope of the appended claim.

We claim:

A fishing rod tip comprising an eye, a securing ring therefor, a ferrule to which said ring is obliquely affixed, an innermost cap member affixed to the fishing rod end, an intermediate member telescoping said cap member, the said intermediate member serving as a bearing for the above-mentioned ferrule, and means for the angular adjustment of the ferrule with the fishing rod.

LOUIS GURRIERI.
SALVATORE GURRIERI.